(12) United States Patent
Manning

(10) Patent No.: US 10,156,305 B2
(45) Date of Patent: Dec. 18, 2018

(54) PIPE JOINT

(71) Applicant: ACORN INTELLECTUAL PROPERTIES LIMITED, Channel Islands (GB)

(72) Inventor: John Patrick Manning, Norfolk (GB)

(73) Assignee: ACORN INTELLECTUAL PROPERTIES LIMITED, Channel Islands (GB)

( * ) Notice: Subject to any disclaimer, the term of this patent is extended or adjusted under 35 U.S.C. 154(b) by 0 days.

(21) Appl. No.: 14/432,133

(22) PCT Filed: Sep. 30, 2013

(86) PCT No.: PCT/GB2013/052533
§ 371 (c)(1),
(2) Date: Mar. 27, 2015

(87) PCT Pub. No.: WO2014/049375
PCT Pub. Date: Apr. 3, 2014

(65) Prior Publication Data
US 2015/0276103 A1    Oct. 1, 2015

(30) Foreign Application Priority Data
Sep. 28, 2012  (GB) .................................. 1217431.4

(51) Int. Cl.
*F16L 21/02* (2006.01)
*F16L 21/00* (2006.01)
*F16L 37/14* (2006.01)

(52) U.S. Cl.
CPC ............. *F16L 21/02* (2013.01); *F16L 21/002* (2013.01); *F16L 37/14* (2013.01); *F16L 37/148* (2013.01)

(58) Field of Classification Search
CPC ......... F16L 21/02; F16L 21/025; F16L 37/14; F16L 37/142; F16L 37/148
(Continued)

(56) References Cited

U.S. PATENT DOCUMENTS 2,038,871 A  *  4/1936  Mueller ................ F16L 37/148
                                              285/289.3
3,869,132 A      3/1975  Taylor et al.
(Continued)

FOREIGN PATENT DOCUMENTS

DE         29720908 U1    1/1998
DE    202013103804 U1 * 11/2014 ............ F16L 37/148
(Continued)

OTHER PUBLICATIONS

International Search Report for PCT/GB2013/052533 dated Feb. 21, 2014.

*Primary Examiner* — David Bochna
(74) *Attorney, Agent, or Firm* — TannerIP PLLC; Daniel A. Tanner, III; James E. Golladay, II

(57) ABSTRACT

A pipe joint includes a conduit having two connection ends wherein each connection end comprises: a wall defining a receiving recess for receiving an end of a pipe length; one or more channels on the internal surface of the wall, each channel housing a sealing ring located within the channel; one or more grooves formed to a depth in an internal surface of the wall of the receiving recess; a channel communicating between the groove and an external surface of the connection end, and a connector formed from a length of material which is seatable within the groove via the channel and which is wider than the depth of the groove so that when seated within the groove the connector extends into the receiving recess; first and second pipe lengths to be connected together in the conduit, each pipe length being formed with a groove on its external surface corresponding (Continued)

to the or each groove in the internal surface of the wall of one of the connecting ends, such that the ends of the pipe lengths in the conduit abut each other.

14 Claims, 6 Drawing Sheets

(58) Field of Classification Search
USPC .......................................................... 285/305
See application file for complete search history.

(56) References Cited

U.S. PATENT DOCUMENTS

| | | | | |
|---|---|---|---|---|
| 4,867,483 A | * | 9/1989 | Witt | F16L 37/148 285/23 |
| 5,149,148 A | * | 9/1992 | Taeuber, Jr. | F16L 37/148 277/322 |
| 5,383,694 A | * | 1/1995 | Taeuber, Jr. | F16L 37/148 285/305 |
| 6,913,293 B1 | * | 7/2005 | Filer | F16L 37/148 285/305 |
| 6,921,114 B1 | * | 7/2005 | Washburn | F16L 37/148 285/305 |
| 7,108,295 B1 | * | 9/2006 | Zarynow | F16L 37/148 285/305 |
| 2002/0130516 A1 | * | 9/2002 | Sewell | F16L 37/148 285/330 |
| 2004/0195834 A1 | * | 10/2004 | Steingass | F16L 37/148 285/321 |

FOREIGN PATENT DOCUMENTS

| | | | | |
|---|---|---|---|---|
| GB | 1097192 A | * | 12/1967 | ............ F16L 37/148 |
| GB | 1329217 A | * | 9/1973 | ............ F16L 37/148 |
| GB | 2478665 A | | 9/2011 | |
| WO | WO 2009024230 A2 | * | 2/2009 | ............ F16L 37/148 |
| WO | WO 2011150449 A1 | * | 12/2011 | ............ F16L 37/148 |

* cited by examiner

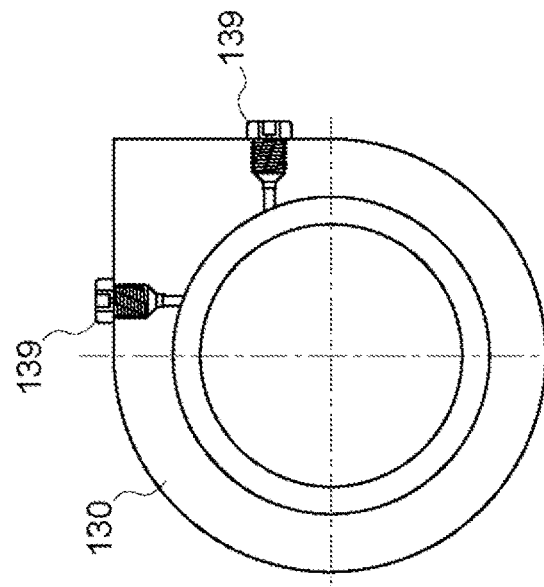
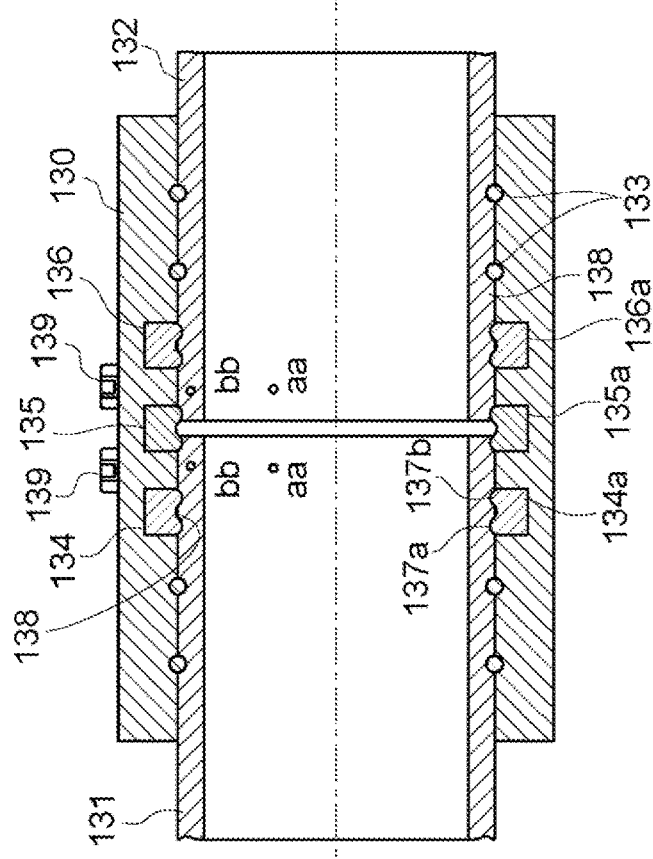

PIPE JOINT

FIELD OF THE INVENTION

The present invention relates to a joint for connecting tubular conduits, in particular for connecting lengths of pipe to form a fluid transport system.

BACKGROUND OF THE INVENTION

Fluid transport systems are known for conveying materials, such as liquids and gasses, with common examples including water and fuels such as gas and oil. The systems may include oil and gas pipelines for conveying fuel over thousands of miles. The tubular conduits used in fluid transport of fuel may be made of different metals, including steel, iron, copper, aluminium and plastic.

For small bore plastic pipes a press or screw fit joint can be used, and in copper pipe, the use of soft solder is the usual means of joint connection. Such joints find particular use in domestic hot water and heating systems.

For larger diameter pipes, typically 1 to 1.5 m meters (around 40 to 60 inches) in diameter, used in the transport of fuel, welded joints are commonly used. However, welded joints have the disadvantage of requiring skilled workers as well as having negative health and safety and environmental implications. For example, the construction of gas or oil conveying pipelines, which are typically made from approximately 12 meter (40 feet) long lengths of steel pipe with a diameter of 1 to 1.5 meters (around 40 to 60 inches) and conventionally uses welded joints. Each joint can take a skilled team a whole day to make, when taking into consideration, the deployment of equipment at the joint location and inspection of the joint by X-ray equipment Also, around 1 in 10 of such welded joints will have to be repaired after an inspection. This makes oil and gas pipelines expensive and time consuming to construct and maintain.

A further problem with press fit and welded joints is that they are difficult to disconnect, for example, for repair or maintenance, and once disconnected are not generally re-useable. Furthermore, disconnection of press fit or welded joints often results in damage to the pipe lengths.

WO10/046627 discloses the use of a connector joint to join together two pipe sections. The connector is seated in a groove, which can be formed of two aligned channels in each of a pipe section and a connection sleeve. The connector utilised is of circular cross-section and has a number of disadvantages associated therewith. Firstly, where the connector has a graspable handle, and said handle is seated, in use against one of the pipe sections or the sleeve, there is a risk of vibrations within the pipe causing loosening of the connector. Additionally, the use of an end face abutment between the two neighbouring pipe sections being connected can make fitment more difficult.

A further disclosure of a joint is disclosed in PCT/GB11/50793 in which connectors having an aspect ratio of greater than 1 are disclosed.

The current invention is capable of use with both types of the above connectors.

SUMMARY OF THE INVENTION

In accordance with one aspect of the present invention, there is provided a pipe joint comprising:
a conduit having two connection ends wherein each connection end comprises:
  a wall defining a receiving recess for receiving an end of a pipe length;
  one or more channels on the internal surface of the wall, each channel housing a sealing ring located within the channel;
  one or more grooves formed to a depth in an internal surface of the wall of the receiving recess;
  a channel communicating between the groove and an external surface of the connection end, and
  a connector formed from a length of material which is seatable within the groove via the channel and which is wider than the depth of the groove so that when seated within the groove the connector extends into the receiving recess;
first and second pipe lengths to be connected together in the conduit, each pipe length being formed with a groove on its external surface corresponding to the or each groove in the internal surface of the wall of one of the connecting ends, such that the ends of the pipe lengths in the conduit abut each other and also including a between-pipe O-ring engaging the pipe ends and forming a seal between the ends of the pipe lengths. The connector, when seated in the groove in the wall of the end connection, extends into the corresponding groove in the pipe length. In order to provide a stable fixing, which also contributes to the sealing of the pipe length within the pipe joint, the connector may fit snugly between the grooves.

A pipe length may be fitted into the pipe joint by following the steps of: inserting an end of the pipe length into a receiving recess of the conduit; aligning the or each groove in the pipe length with the corresponding groove or grooves in the internal wall of the receiving recess; and inserting the or each connector, via the channel, into a space formed by the aligned grooves. The or each groove in the pipe length can match a corresponding groove in the wall of the receiving recess and a connector may be provided for each set of corresponding grooves.

The fitting of the pipe length into the pipe joint can be carried out by sliding the length of material forming the connector along the space between the corresponding grooves via the channel. The connector straddles the groove in the internal surface of the wall of the receiving recess and the groove in the external surface of the pipe length to fix the pipe length in the pipe joint. Furthermore, by allowing pipe lengths within the joint to abut each other, the fitment of the conduit is facilitated especially where, as is frequently the case, limited space is available.

The pipe joint according to the present invention is relatively cheap to make and install. It is also safe to install as it does not require welding. In addition, the fixing can be undone for repair or maintenance from the outside of the pipe joint by simply removing the connector from the grooves via the channel. An engagement means may, for example, be a graspable hook provided at one end of the connector for this purpose.

Fitting the pipe length within the pipe joint may comprise the additional steps of forming the groove in the internal surface of the wall of the or each connecting end and forming the groove in the external surface of the pipe length. Cutting tools are available in the art for cutting such grooves in pipes and pipe joints.

The connector may be formed from a length of resilient material which is able to take up the shape of the groove in the internal surface of the wall of the receiving recess, when the connector is moved via the channel into the groove. For example, the connector may be formed from a length of metal, such as a bar of spring steel or a length of metal wire.

The metal wire can be formed of multiple strands. In addition, the connector may be covered with a lubricating coating, such as Teflon®, to aid the movement of the connector through the channel and the groove.

There may be one or more grooves in the receiving recess, with a corresponding channel and connector for each groove. In this case a corresponding number of grooves may be formed on the external surface of the pipe end. The or each groove in the receiving recess or the pipe length may have a transverse cross-section which matches a segment of a transverse cross-section of the connector; in particular, the segment may be a substantially circular segment or alternatively have an aspect ratio of greater than 1.

The grooves in the receiving recess may extend in a substantially circumferential direction along the internal surface of the wall of the receiving recess. Similarly, the grooves in the pipe length may extend in a substantially circumferential direction along the external surface of the pipe length. For example, the grooves may be annular grooves and the connector may extend substantially all the way around the groove. This arrangement provides a fixing between the connecting end and the pipe length which extends all the way around the pipe length, thus providing a high-strength connection. The or each groove in the receiving recess may alternatively extend helically around the internal surface of the wall of the receiving recess. In this case the helical groove may extend at least once around the receiving recess.

The length of material of the connector may have a first end insertable into the channel and a second end, remote from the first end, the connector extending beyond the channel to retain the second end in spaced-apart relationship to a conduit or pipe length and reduce the effect of pipe vibration on the connector. In order to facilitate insertion of the connector into the groove via the channel, the channel and the groove may merge smoothly.

The conduit may comprise another length of pipe or any other conduit used to connect to one or more pipe lengths.

Typically, the internal surface of the wall of the receiving recess may be substantially cylindrical, in order to receive a standard cylindrical pipe.

Preferably the between-pipe O-ring seal includes two or more ridges along the pipe-engaging surface. The ridges and the inter-ridge region act to alleviate and control excess pressure on the pipe joint.

Optionally, the or each sealing ring includes two or more ridges along the pipe-engaging surface.

Preferably, the ends of the pipe lengths have chamfered surfaces, a between-pipe O-ring lying in the channel defined by said chamfered surfaces.

Optionally, a between-pipe O-ring comprises a central ring of elastomeric material surrounded by a metal split-ring which absorbs and utilises pressure within the pipes to form a metal-metal seal.

Further features and advantages of the invention will become apparent from the following description of preferred embodiments of the invention, given by way of example only, which is made with reference to the accompanying drawings.

BRIEF DESCRIPTION OF THE DRAWINGS

The invention is now described with reference to the accompanying drawings which show by way of example only three embodiments of a pipe joint. In the drawings:

FIG. 9A is a longitudinal sectional view in accordance with a sixth embodiment of the invention and FIG. 9B an end-sectional view through the gap between pipes and illustrating test ports.

DETAILED DESCRIPTION OF THE INVENTION

Figure 1:
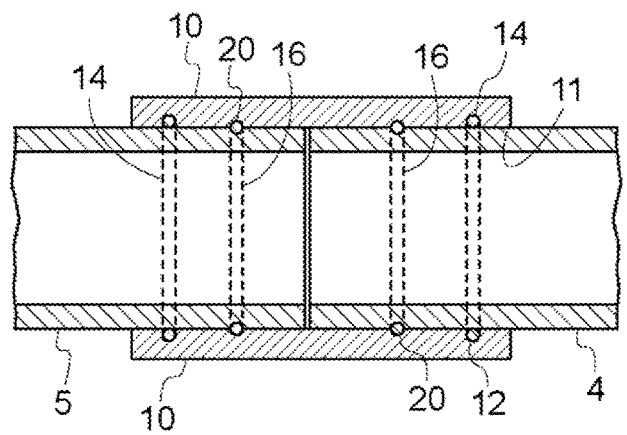
FIG. 1, shows a partial transverse cross-section through a joint.
Figure 2:
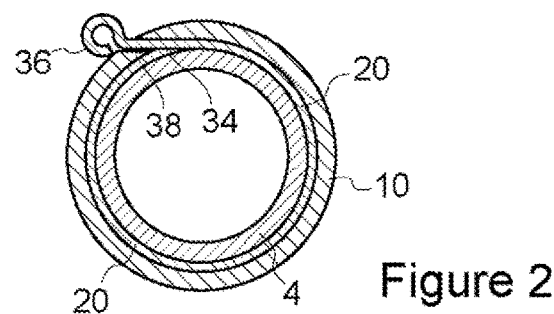
FIG. 2, shows a partial longitudinal cross-section of a pipe joint in accordance with the present invention.

Referring initially to FIG. 1, there is shown an embodiment of the present invention. FIG. 1 shows a pipe joint in the form of a simple coupler 10 having a receiving recess 11 which can be used for joining two lengths of pipe 4, 5 together. The coupler 10 is provided with an annular seal in the form of an O-ring 12 located in an annular groove 14 formed in the internal surface of the walls of the receiving recess 11. Referring also to FIG. 2, the connection ring 20 in this embodiment includes a graspable handle 36. The ends of the pipe lengths 4, 5 abut each other within the coupler 10.

The above arrangement facilitates fitment of the coupler 10 in the following manner. The first pipe length 4 is inserted into a first end of the receiving recess 11. The coupler 10 can be slid along the pipe length 4 to a sufficient extent to allow the second pipe length 5 to be brought into axial alignment with the first pipe length 4. Because the coupler 10, unlike prior art couplers having an abutment against which the first pipe length would stop, can be moved such that the coupler 10 does not overhang the end of the first pipe length 4. There is therefore more space available to enable the second pipe length 5 to be correctly positioned. Once the second pipe length 5 is correctly positioned, the coupler 10 can be slid such that it covers both pipe lengths 4, 5 and so that the grooves can be aligned to form the annular channel space 14. The connection rings 20 are then inserted into the annular channel space 14 to hold the pipe lengths 4, 5 within the coupler 10.

Referring now to FIG. 2 additionally a connector, referred to also herein as a connection ring 20 is fitted in the annular channel 16 space formed by the aligned grooves of a pipe length 4 and a receiving recess 11 of the coupler 10 of the pipe joint. The connection ring 20 is formed from a length of material, for example a length of metal wire (which may be multi-stranded) or a bar of sprung steel, which material has a substantially circular cross-section. One end of the length of material may be formed into a graspable handle 36, for example, in the form of a hook. With the handle 36 abutting the external surface of the wall of the receiving recess in the conduit, adjacent the channel 16, the length of material is long enough to fill the annular space formed by the annular grooves i.e. long enough to extend completely around the channel in the end of the pipe length 4.

Where the space formed by the grooves has a non-circular cross-section, the cross-section of the connection ring 20 is matched to the cross-section formed by the aligned grooves so that the connection ring 20 fits snugly between the aligned grooves. The connection ring 20 performs the function of locking the pipe length 4 within the receiving recess of the pipe joint. This is achieved by providing an interference fit which inhibits separation of the pipe joint when the connection ring 20 is located within the annular space formed by the aligned annular grooves. The conduit of the pipe joint thus has two ends each capable of receiving the end of a pipe length and joining the two pipe lengths together in a fluid-tight manner.

It has been found particularly advantageous that the handle 36 or other embodiments thereof be separated, following complete insertion of the connection ring 20, in spaced apart relationship to the coupler 10 or pipe lengths 4, 5. This minimises the risk of vibrations within the joint or pipeline from causing the connection ring 20 to work loose.

The connection between the pipe joint and the end of the pipe length 4 is formed as follows. The end of a first pipe length 4 is slideably located within the receiving recess of the conduit of the pipe joint.

An end 38 of the length of material forming the connection ring 20, which end 38 is remote from the graspable handle 36, is inserted via the channel 34 into the space 16 formed by the grooves. The length of material forming the connection ring 20 is pushed around the annular space formed by the grooves until the graspable handle 36 abuts the external surface of the wall of the coupler 10 and the connection ring 20 surrounds the end of the pipe length 4. The connection ring 20 can be pushed into the annular space manually or by means of machinery, for example a hydraulic system. The length of material forming the connection ring 20 is flexible and resilient so that it is capable of taking the shape of the annular space formed between the grooves as it is inserted into the channel 34 and pushed around the annular space. The length of material forming the connection ring 20 may also be covered by a lubricating coating, such as a coating made from Teflon®. Alternatively or in addition, the connection ring 20 may be lubricated with oil or any other suitable lubricant before it is inserted into the annular space formed between the grooves.

Figure 3:
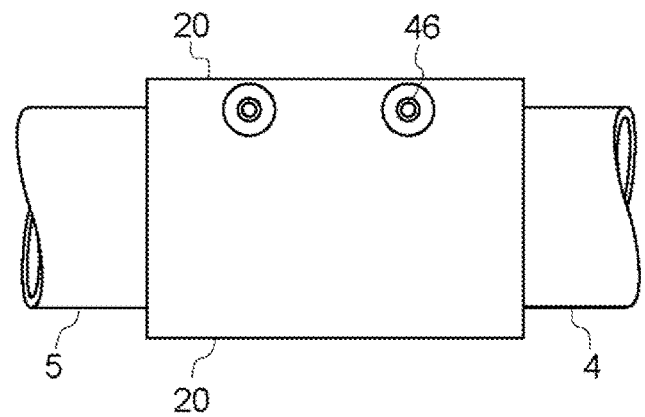
FIG. 3, shows a side view of the pipe joint of FIG. 2.

FIG. 3 illustrates an alternative embodiment of a coupler 10 in which the connector 20 does not have a graspable handle 36, but instead includes a screw-head or bolt-head 46 to assist in machine aided insertion of the connector 20.

It will be appreciated that the lubricant will also serve a sealing purpose. In certain applications the conduit or pipe may not be used a part of a fluid transport system; for example, the conduit could be used an electrical conduit for housing electrical wires. Alternatively, the conduit may be used in the construction industry and may be installed as a structure such as a barrier, handrail, mast or the like. The conduit may be used as a support, for example, as scaffolding, a support beam, rafter or the like. In these applications the joint may not require a seal 12.

Figure 4:
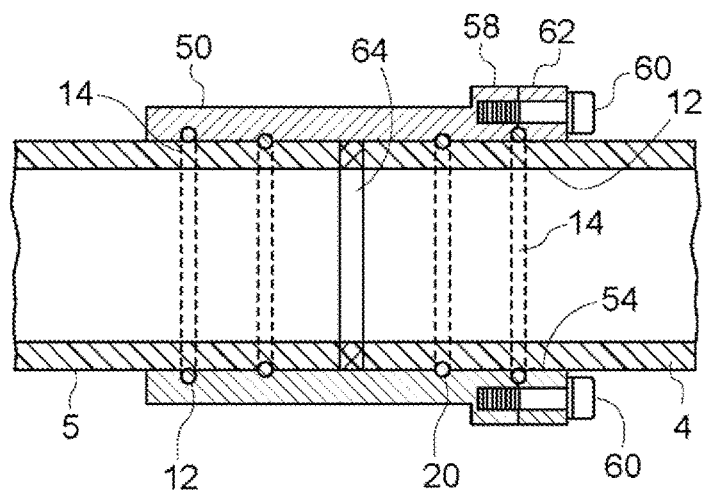
FIG. 4, shows a partial longitudinal cross-section of a pipe joint in accordance with a second embodiment of the present invention.
Figure 5:
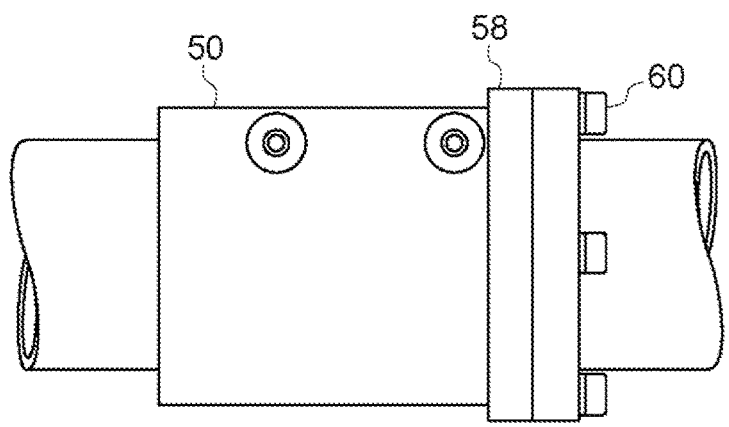
FIG. 5, shows a side view of the pipe joint of FIG. 4.

Referring now to FIGS. 4 and 5, in an alternative embodiment the coupler 50 may be arranged to include a flange 58 at, at least one of its ends. The flange 58 may be drilled and tapped to provide a threaded bore. A securing collar 62 which can be slipped over the pipe end 4 may be fastened to the flange 58 by bolts 60 that can be received in the threaded bore of the flange 58. The flange 58 may also be provided with a recess in which a sealing ring can be located to form a seal between the flange 58 and the collar 62.

In this embodiment, a floating abutment 64 separates the pipe lengths 4, 5. The floating abutment 64 acts to prevent abrasion between the ends of the pipe lengths 4, 5 and can also act as an additional seal. The shape and dimensions of the floating abutment 64 are chosen to suit the use of the joint, but will generally be an annular ring. It will be recognised that a floating abutment is also of advantage in other embodiments described herein.

Figure 6:
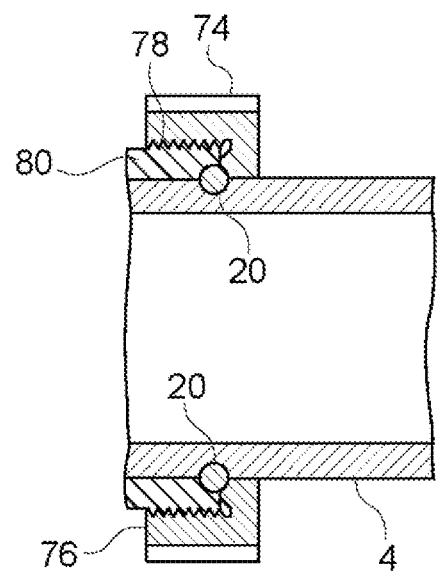
FIG. 6, shows a partial longitudinal cross-section of a pipe joint in accordance with a third embodiment of the invention.

Referring now to FIG. 6, the pipe joint may comprise a securing collar 74. The securing collar 74 is provided with a threaded inner surface 76 that is adapted to mate with a threaded outer surface 78 of the coupler 80 of the pipe joint. The connection ring 20 is included as previously. This arrangement allows a split-ring to be slipped over the end of the pipe length 4 and locked into position in the groove formed in the end of the pipe length 4. The end of the pipe length 4 is joined to the coupler 80 by "running-up" the securing collar 74 onto the threads 78 on the connection end 18. Once the securing collar 74 has been run-up far enough, the securing collar 74 will abut the connection ring 20 and will drive the end of the pipe length 4 into the recess. The securing collar 74 may be run-up using a C spanner or by any other suitable method known in the art.

Figure 7:
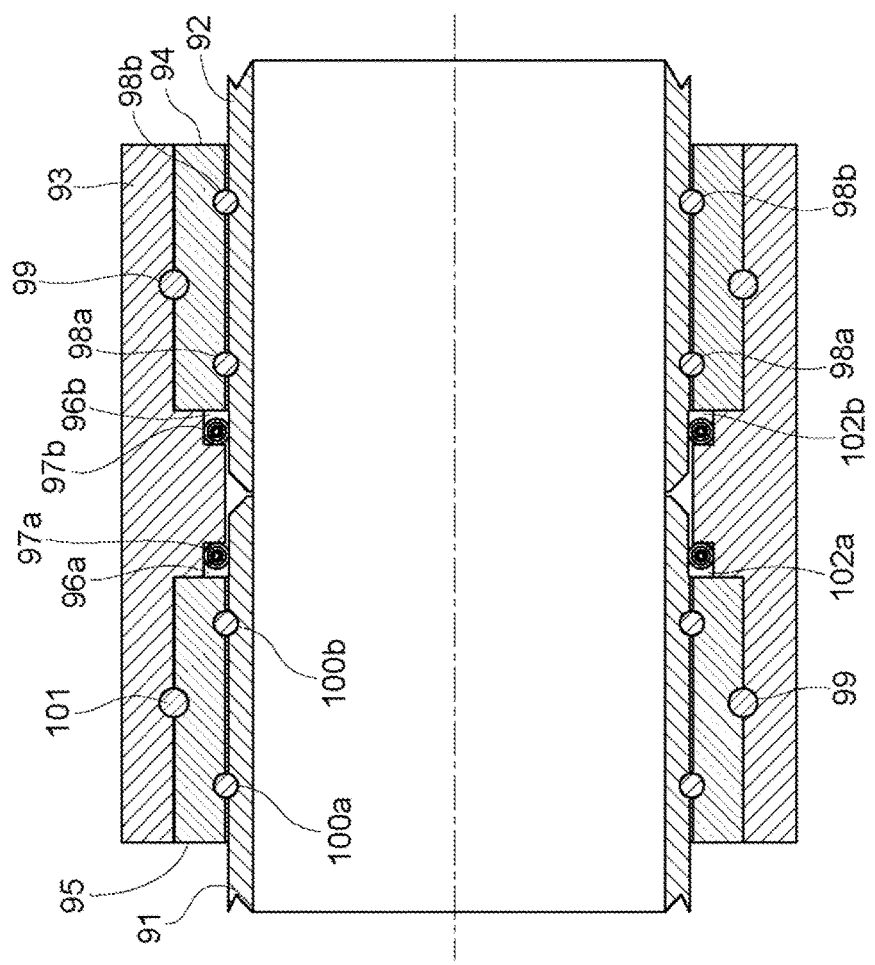
FIG. 7 is a longitudinal sectional view in accordance with a fourth embodiment of the invention.

FIG. 7 illustrates an alternative embodiment of a coupler 90 for connecting together two pipes 91, 92. The coupler 90 comprises 3 sections 93-95 each being of annular construction to pass around the pipes 91, 92 which sections 93-95 co-operate together to provide a robust seal and connection between the pipes 91, 92. The central linkage section 93 has a T-shaped cross-section to enable contiguous engagement with the sections 94, 95. The linkage section 93 has annular grooves 96a, 96b into which are inserted prior to placement of the sections 94, 95, metal sealing elements 97a, 97b. The elements 97a, 97b provide a seal and prevent escape of the fluid flowing within the pipes 91, 92.

In order to secure the coupler 90 in position and to retain the pipes 91, 92 in their in-use relationship once the sections 94, 95 are in position, the connectors 98a, 98b and 99 are pushed into the grooves 100a, 100b, 101 as described above in relation to FIG. 1. It will be noted that sealing is enhanced in that the annular grooves 96a, 96b co-operate with the respective walls 102a, 102b of the sections 94, 95 to provide a channel for the elements 97a, 97b.

This embodiment facilitates replacement of the elements 97a, 97b when required, as the connectors 98a, 98b, 99 are simply removed, and the sections 94, 95 slid out from between the coupler 90 and the pipes 91, 92. The old elements 97a and 97b can then be removed and replaced with new elements 97a, 97b. the sections and connections are then put back in place in the reverse order to their removal.

Figure 8:
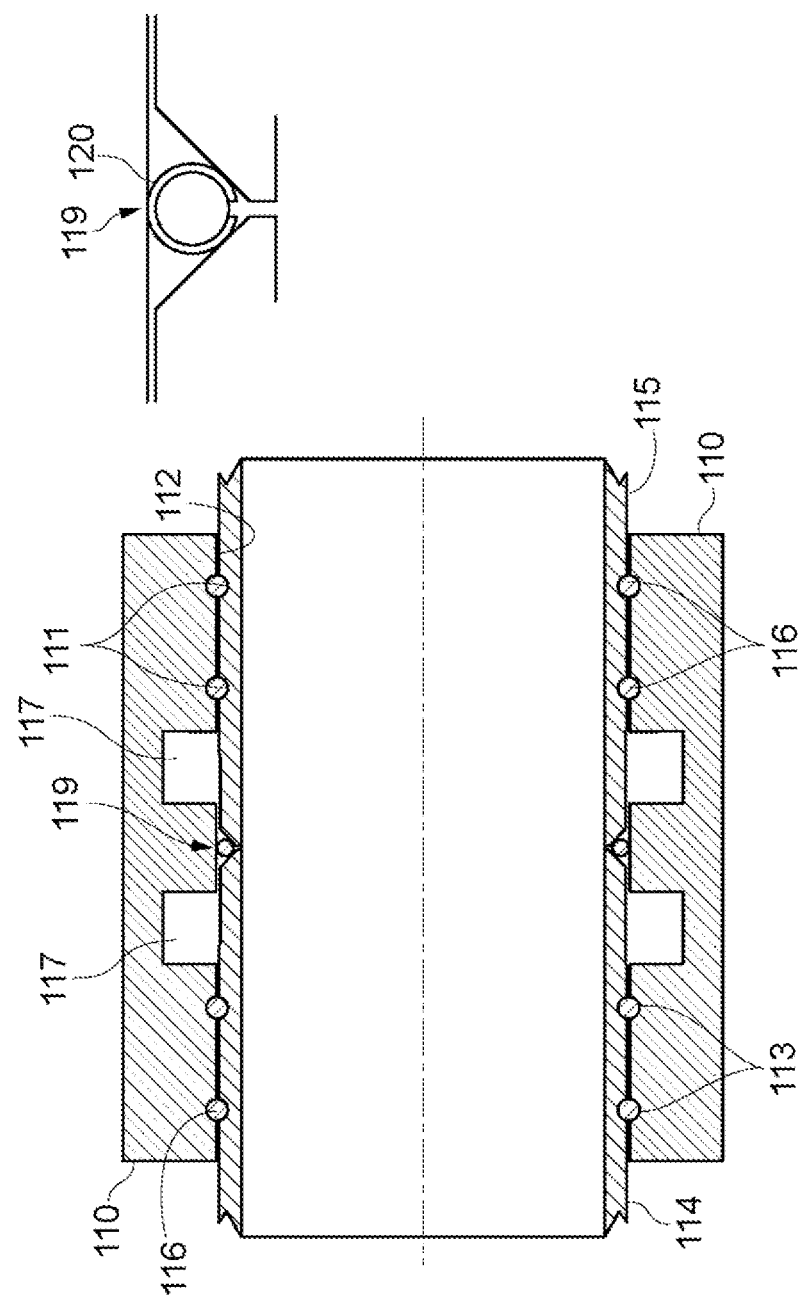
FIG. 8 is a longitudinal sectional view in accordance with a fifth embodiment of the invention with a magnified view of a between-pipe seal.

FIG. 8 illustrates a yet further embodiment of a coupler 110. Similarly to the above described couplers, the coupler 110 has grooves 111 cut into its inner surface 112 which co-operate with grooves 113 cut into each of the pipes 114, 115 being joined together to form a channel. Into the channels thereby formed are inserted connectors 116 as already described herein.

The coupler 110 includes two larger annular channels 117 in which can be seated O-ring seals to prevent or reduce escape of fluid from the coupling.

It will be noted that the wall at the end of each of the pipes 91, 92 includes an optional thinning which produces a step 118 in the region of alignment with the channels 117. The step 118 assists in resisting movement of the O-ring seat when in use. In addition to the above, a further seal 119 is included in the annular space formed by the coupler 110 and the chamfered ends of the pipes 91, 92. As shown in the expanded view of FIG. 8a of the further seal 119, the seal 119 comprises a central core of, optionally, elastomeric material strengthened along its length by a split ring 120. In use, pressure within the pipe 91, 92 which escapes into the gap between the pipes 91, 92, pushes against the elastomeric material of the seal 119 which itself acts to force apart the split ring 120, the split ring 120 sealing against the chamfered walls of the pipes 91, 92.

Turning to FIGS. 9A and 9B, a sealed joint suitable for use in conjunction with test ports 139 by which the internal pressure within the pipe around the pipe joint, can be measured, is shown. The coupler 130 is similar to that shown in FIG. 8, in that a single piece, annular coupler is placed about the two pipes 131, 132 to be joined. Connectors 133, located in the channels formed by co-operating grooves in the coupler 130 and the pipes 131, 132 act to prevent lateral movement of the pipes 131, 132 away from each other along the axis of the pipes 131, 132.

The coupler has 3 annular channels 134-136, each to retain an O-ring 134a-136a, to provide a seal. The O-rings 134a-136a are profiled and include two ridged portions 137a, 137b. Without being bound to theory it is believed that in the event of pressure leaking between the pipes 131, 132, the ridges 137a, 137b act to an extent as separate, O-ring seals. Should pressure therefore leak through a first ridged portion of an O-ring 134a-136a, it will initially only penetrate to the inter-ridge region 138. This acts firstly as a partial release of pressure so that the pressure on the second ridged portion of the O-ring is less than on the first. Moreover, the pressure equalisation between the inter-ridge region 138 and the pipe acts to reduce forces across the first ridged portion.

The above embodiments are to be understood as illustrative examples of the invention. Further embodiments of the invention are envisaged. For example, the connection ring 20 and sealing ring 12 illustrated in FIG. 1 may be interchanged, such that the sealing ring 12 is closer to the engagement region of the pipe lengths 4, 5. Such an arrangement would stop the connection ring 20 from being exposed to the fluid passing through the system, which in certain circumstances may be corrosive to the connection ring 20.

The bolt 60 shown in FIG. 4 may be replaced with studding that extends from the flange 58 and the collar 62 may be secured by the use of nuts and washers.

Although it has been stated above that the connection ring 20 may be coated with Teflon® to aid with insertion and extraction of the connector from the groove it would also be possible to coat or impregnate the connection ring 20 with another plastics material to lubricate the connection ring.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A pipe joint comprising:
   a conduit having two connection ends wherein each connection end comprises:
      a wall defining a receiving recess for receiving an end of a pipe length;
      one or more channels on an internal surface of the wall, each channel housing a sealing ring located within the channel, the sealing ring including two or more ridges along a pipe-engaging surface;
      a groove formed to a depth in an internal surface of the wall of the receiving recess;
      a channel communicating between the groove and an external surface of the connection end; and
      a connector formed from a length of material which is seatable within the groove in the internal surface of the wall of the receiving recess via the channel and which is wider than the depth of the groove in the internal surface of the wall of the receiving recess so that, when seated within the groove in the internal surface of the wall of the receiving recess, the connector extends into the receiving recess,
   first and second pipe lengths being connected together in the conduit, each pipe length being formed with a groove on an external surface of the pipe length corresponding to the groove in the internal surface of the wall of the receiving recess of one of the connecting ends, such ends of the first and second pipe lengths in the conduit abut each other, and
   a between-pipe O-ring engaging the ends of the first and second pipe lengths and forming a seal between the ends of the first and second pipe lengths, the between-pipe O-ring seal including two or more ridges along a pipe-engaging surface.

2. A pipe joint according to claim 1, wherein the connector is formed of a length of resilient material that takes the shape of the groove in the internal surface of the wall of the receiving recess.

3. A pipe joint according to claim 2, wherein the connector is formed of a length of metal.

4. A pipe joint according to claim 3, wherein the connector is covered with a lubricating coating.

5. A pipe joint according to claim 4, wherein the lubricating coating is Teflon®.

6. A pipe joint according to claim 3, wherein the length of metal is one of a bar of spring steel and a length of metal wire.

7. A pipe joint according to claim 1, wherein the or each groove in the receiving recess or the pipe length has a transverse cross-section which matches a segment of a transverse cross-section of the connector.

8. A pipe joint according to claim 7, wherein the segment is a circular segment.

9. A pipe joint according to claim 7, wherein the segment has an aspect ratio of greater than 1.

10. A pipe joint according to claim 1, wherein the ends of the first and second pipe lengths have chamfered surfaces, the between-pipe O-ring lies in the channel defined by the chamfered surfaces.

11. A pipe joint according to claim 1, wherein the between-pipe O-ring comprises a central ring of elastomeric material surrounded by a metal split-ring.

12. A pipe joint according to claim 1, wherein the groove in the receiving recess extends in a circumferential direction along the internal surface of the wall of the receiving recess.

13. A pipe joint according to claim 1, wherein the groove in external surface of the pipe length extends in a substantially circumferential direction along the external surface of the pipe length.

14. A pipe joint according to claim 1, wherein the groove in the receiving recess extends helically around the internal surface of the wall of the receiving recess.

* * * * *